Patented June 16, 1953

2,642,428

UNITED STATES PATENT OFFICE 2,642,428

QUATERNARY AMMONIUM ETHYL THIOCARBAMATES

John Weijlard and Max Tishler, Westfield, N. J., assignors to Merck & Co., Inc., Rahway, N. J., a corporation of New Jersey No Drawing. Application February 8, 1950, Serial No. 143,158

4 Claims. (Cl. 260—247.1)

This invention is concerned generally with a new group of antispasmodics related to choline. More particularly, it relates to dimethylalkyl-$\beta$-(formylmercapto)ethyl-ammonium salts wherein the hydrogen of the formyl grouping is replaced by a piperidino or morpholino radical; to the process for preparing these novel quaternary ammonium salts and to the intermediate products thus obtained.

Certain quaternary ammonium salts, such as Dibutoline Sulfate (dimethylethyl-$\beta$-hydroxyethyl-ammonium sulfate dibutyl urethane), have previously been found to be effective antispasmodics. The presently disclosed quaternary salts, although somewhat similar in structure to Dibutoline, differ from Dibutoline by having a sulfur atom substituted for oxygen and by containing a heterocyclic substituent. The herein described novel heterocyclic thio analogs of Dibutoline, the dimethylethyl-$\beta$-[piperidino (and morpholino) formylmercapto]ethyl-ammonium salts, possess the extremely important advantage with respect to Dibutoline of being very much less toxic than Dibutoline, while being equal to or superior to Dibutoline in antispasmodic activity. These novel quaternary salts have also been found to possess anti-tubercular activity.

These dimethylalkyl-$\beta$-[piperidino (and morpholino) formylmercapto]ethyl-ammonium salts may be chemically represented as follows:

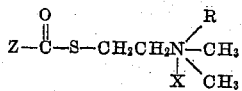

wherein R is an alkyl radical, X is an anion, and Z is a member of the group consisting of piperidino and morpholino radicals.

We have discovered that these dimethylalkyl-$\beta$-[piperidino (and morpholino) formyl-mercapto]ethyl-ammonium salts can be prepared by reacting dimethylaminoethylthiol with a substituted carbamyl chloride of the class consisting of piperidino-formyl chloride and morpholino-formyl chloride, these carbamyl chlorides having the formula:

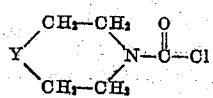

wherein Y is an —O— or a —CH$_2$— grouping, to produce a thiolurethane of the formula:

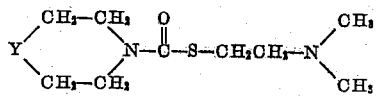

wherein Y has the significance defined on the preceding page, and reacting said thiolurethane with an alkyl ester of an inorganic acid, for example an alkyl iodide, such as ethyl iodide, propyl iodide, butyl iodide, amyl iodide, and the like, a dialkyl sulfate, such as diethyl sulfate, and the like, to produce a quaternary salt of the formula:

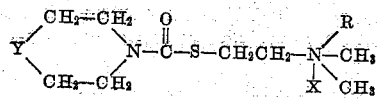

wherein R is an alkyl radical, X is an anion and Y has the significance defined hereinabove.

The dimethylaminoethylthiol starting material can be prepared by reacting dimethylaminoethyl chloride and sodium hydrosulfide as described in Example 1 hereinbelow. The substituted carbamyl chloride, i. e. the piperidino-formyl chloride or morpholino-formyl chloride can be prepared by reacting piperidine or morpholine with phosgene according to the procedure set forth in the illustrative examples and described in J. Chem. Soc. 1947, 313. The dimethylaminoethylthiol and the substituted carbamyl chloride can be prepared in purified form, if desired, by fractional distillation in vacuo.

The reaction between the dimethylaminoethylthiol and the piperidino-formyl chloride or morpholino-formyl chloride is ordinarily carried out in the presence of a hydrogen chloride acceptor. The hydrogen chloride acceptor is preferably an organic base such as a compound containing a pyridine ring, such as pyridine, quinoline, picoline, and the like, and preferably an acceptor that also acts as a solvent for the reactants. The reaction is conveniently carried out by heating the reactants under reflux in the presence of pyridine under which conditions the reaction is ordinarily complete in approximately 3 hours. The thiolurethane thus produced is conveniently freed of non-basic impurities by evaporating the pyridine, dissolving the residual material in water, acidifying the aqueous solution and extracting the acidified solution with a water-immiscible organic solvent such as ether to remove impurities. The aqueous solution is then made alkaline and extracted with a water-immiscible solvent such as chloroform. Upon evaporation of the dried chloroform extracts there is obtained the desired dimethyl-$\beta$-[piperidino (or morpholino) formylmercapto]ethylamine, which belongs to the class of compounds known as thiolurethanes and can be represented by the formula:

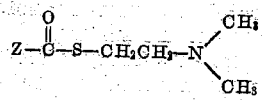

wherein Z is a radical selected from the group which consists of piperidino and morpholino radicals.

This thiolurethane is then reacted with an alkyl ester of an inorganic acid, as for example a dialkyl sulfate, such as diethyl sulfate, an alkyl iodide, such as ethyl iodide, n-propyl iodide, n-butyl-iodide, n-amyl iodide, and the like, to produce the corresponding quaternary ammonium salt of the formula:

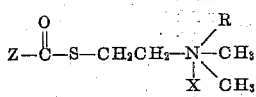

wherein R is an alkyl radical, X is an anion, and Z is a piperidino or morpholino radical.

The reaction between the thiolurethane and the dialkyl sulfate (preferably diethyl sulfate) is conveniently conducted by bringing the reactants together in diethyl ether solution at substantially room temperature. Under these conditions the reaction is ordinarily substantially complete in about 15 hours and the quaternary dimethylalkyl-$\beta$-(N,N-disubstituted - carbamyl - mercapto) ethyl-ammonium salt can be recovered by filtration.

When the thiolurethane is reacted with an alkyl iodide the reaction is ordinarily carried out by mixing the reactants in the absence of a solvent and agitating the resulting mixture at a temperature of about 25–30° C. for a period of about 3 hours. The mixture is ordinarily allowed to stand overnight to insure completion of the reaction. The product, which is the corresponding dimethylalkyl-$\beta$-[piperidino (or morpholino) formylmercapto] ethyl-ammonium iodide is then converted to the corresponding sulfate by reaction with powdered silver sulfate in the presence of ethanol.

Examples of these quaternary salts having the formula:

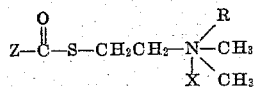

wherein R is alkyl, X is an anion, and Z is a member of the group consisting of piperidino and morpholino radicals, are the following:

(1) Dimethylethyl - $\beta$ - (morpholinoformylmercapto) ethyl-ammonium iodide.
(2) Dimethylethyl - $\beta$ - (morpholinoformylmercapto) ethyl-ammonium sulfate.
(3) Dimethylethyl - $\beta$ - (morpholinoformylmercapto) ethyl-ammonium ethyl sulfate.
(4) Dimethylethyl - $\beta$ - (piperidinoformylmercapto) ethyl-ammonium iodide.
(5) Dimethylethyl - $\beta$ - (piperidinoformylmercapto) ethyl-ammonium sulfate.
(6) Dimethylethyl - $\beta$ - (piperidinoformylmercapto) ethyl-ammonium ethyl sulfate.
(7) Dimethylpropyl - $\beta$ - (piperidinoformylmercapto) ethyl-ammonium sulfate.
(8) Dimethylbutyl - $\beta$ - (piperidinoformylmercapto) ethyl-ammonium ethyl-sulfate.
(9) Dimethylamyl - $\beta$ - (piperidinoformylmercapto) ethyl-ammonium sulfate.
(10) Dimethylpropyl - $\beta$ - (morpholinoformylmercapto) ethyl-ammonium ethylsulfate.
(11) Dimethylbutyl - $\beta$ - (morpholinoformylmercapto) ethyl-ammonium sulfate.
(12) Dimethylamyl - $\beta$ - (morpholinoformylmercapto) ethyl-ammonium ethylsulfate.

The following examples illustrate methods of carrying out the present invention but it is to be understood that these examples are given for purposes of illustration and not of limitation.

*Example 1*

900 g. (6.25 moles) of dimethylaminoethylchloride hydrochloride was dissolved in 850 ml. of water, and 850 ml. of 30% aqueous sodium hydroxide solution was added. The resulting solution was extracted successively with 1000, 500 and 500 ml. portions of diethyl ether. The extracts were combined and the ether was evaporated under reduced pressure to produce approximately 700 g. of crude dimethylaminoethylchloride.

2700 g. (11.2 moles) of sodium sulfide monohydrate was melted in a 5-liter flask provided with a mechanical stirrer, reflux condenser, thermometer and gas inlet tube. Hydrogen sulfide was passed into the molten mixture over a period of 6 to 7 hours during which time the mixture was stirred rapidly and maintained at a temperature between about 50 and 60° C. The dimethylaminoethylchloride (700 g.) was added dropwise to the reaction mixture over a period of approximately 2 hours during which time the contents of the flask were stirred rapidly and maintained at a temperature of 50–60° C. The resulting mixture was then heated to 90–105° C., heated under reflux for one hour and cooled. The reaction mixture was extracted successively with 600 ml., 300 ml., and 300 ml. portions of diethyl ether, the extracts were combined and dried over anhydrous calcium sulfate (Drierite). The ether was then evaporated from the dry ether solution, and the residual material was fractionally distilled. The fraction distilling at 120–140° C. (temperature in distilling flask 140–190° C.) was collected to produce 199 g. of crude dimethylaminoethylthiol (yield approximately 30% of theory).

850 g. of crude dimethylaminoethylthiol (from several preparations) was distilled in vacuo using a 6–8 inch Vigreux column to produce 748 g. of substantially pure dimethylaminoethylthiol; B. P. 37–43° C./20 mm.; recovery yield approximately 88%. Analysis calc'd for $C_4H_{11}NS$: C, 45.66; H, 10.54; N, 13.32. Found: C, 45.44; H, 10.56; N, 13.06.

*Example 2*

About one liter of xylene was placed in a 5-liter, three-necked flask provided with a mechanical stirrer and thermometer. The xylene was cooled to 0° C. and 150 g. (1.5 moles) of phosgene was added thereto. A solution of 174 g. (2 moles) of morpholine in 500 ml. of xylene was added to the phosgene solution over a period of approximately one and one-half hours, said addition being carried out while rapidly stirring the flask contents and maintaining the reaction temperature at approximately 0–5° C. The reaction mixture was stirred for an additional period of about one hour and allowed to stand at room temperature overnight. The morpholine hydrochloride which precipitated was removed by filtration and the precipitate was washed with five 50 ml. portions of xylene. The filtrate and washings were combined and the xylene evaporated therefrom by distillation in vacuo. The residual material was fractionally distilled using a 12 inch Vigreux column to produce substantially pure morpholinoformylchloride; B. P. 69–71° C./1 mm.

55.5 g. (0.37 mole) of morpholinoformylchloride, prepared as described above, was added to a solution containing 42.4 g. (0.4 mole) of dimethylaminoethylthiol (prepared as described in Example 1) in 250 ml. of pyridine. The mixture was stirred and heated under reflux at a temperature of 100–105° C. for a period of 4 hours, and the mixture was then cooled to room temperature. The nearly-solid mass was dissolved in approximately 100 ml. of water and the aqueous solution was evaporated in vacuo at a temperature below 50° C. until a syrup resulted. This concentrate was dissolved in 200 ml. of water and the pH was adjusted to 3 by the addition of 20 ml. of concentrated aqueous hydrochloric acid solution. The resulting solution was extracted with three 200 ml. portions of diethyl-ether and the ether extracts were discarded.

The aqueous solution was made alkaline by adding thereto an excess of sodium carbonate, and the resulting solution was extracted with four 200 ml. portions of ether. The ether extracts were combined, dried over anhydrous calcium sulfate (Drierite) and the ether evaporated. The residual material was heated at 100–110° C. at a pressure of 1 mm. to remove all traces of solvent thereby producing approximately 63 g. of dimethyl-$\beta$-(morpholinoformylmercapto)-ethyl-amine as a liquid; yield approximately 78% of theory.

Example 3

63 g. (0.29 mole) of dimethyl-$\beta$-(morpholinoformylmercapto)ethyl-amine, prepared as described in Example 2, was mixed with about 235 g. (1.5 mole) of ethyl iodide. The mixture was stirred until solution was effected, and the resulting solution was maintained at 25–30° C. for approximately 4 hours. 1000 ml. of diethyl ether was then added and the mixture was allowed to stand overnight. The supernatant liquid was decanted, the reaction product was filtered and repeatedly washed by decantation with ether and then dried in vacuo to produce approximately 108 g. of dimethylethyl-$\beta$-(morpholinoformylmercapto)ethyl-ammonium iodide; M. P. 123–124° C.; yield approximately 100% of theory. Analysis calc'd for $C_{11}H_{23}O_2N_2SI$: C, 35.29; H, 6.19; N, 7.48. Found: C, 35.32; H, 6.13; N, 7.43.

Example 4

82 g. (0.219 mole) of dimethylethyl-$\beta$-(morpholinoformylmercapto)ethyl ammonium iodide, prepared as described in Example 3, was dissolved in approximately 500 ml. of 50% aqueous ethanol and about 47 g. (0.15 mole) of powdered silver sulfate was added to the solution. The resulting mixture was stirred rapidly for two hours, the silver iodide was removed by filtration and washed with five 30 ml. portions of 50% ethanol. The combined filtrate and washings were treated with hydrogen sulfide, the pH was adjusted to 6.5 with barium hydroxide, activated charcoal was added, the mixture was filtered, and the cake was washed with 50% ethanol. The combined filtrate and washings were evaporated in vacuo to a syrup. The syrup was dissolved in ethanol and the solution was again evaporated in vacuo to a syrup. The hot syrup was poured out on a tray, and crystallization took place rapidly. The crystalline material was dried over sulfuric acid at a pressure of 1 mm. to produce 64 g. of dimethylethyl-$\beta$-(morpholinoformylmercapto)ethyl-ammonium sulfate; M. P. 115–117° C.; yield approximately 97% of theory. Analysis calc'd for $C_{22}H_{46}O_8N_4S_3 \cdot 2.5H_2O$: $H_2O$, 7.07. Found: $H_2O$, 7.10. Sample dried to constant weight at 80° C./1 mm. and calc'd for $C_{22}H_{46}O_8N_4S_3$: C, 44.72; H, 7.85; N, 9.48. Found: C, 44.89; H, 7.66; N, 10.00.

Example 5

23.8 g. (0.109 mole) of dimethyl-$\beta$-(morpholinoformylmercapto)ethyl-amine, prepared as described in Example 2, was dissolved in 150 ml. of diethyl ether, 34 g. (0.22 mole) of diethyl sulfate was added, and the mixture was allowed to stand at room temperature overnight. The crystals that formed were recovered by filtration, washed with ether, and dried in vacuo, to produce 29.1 g. of dimethylethyl-$\beta$-(morpholinoformylmercapto)ethyl-ammonium ethylsulfate; M. P. 66.5–68° C.; yield approximately 72% of theory. Analysis calc'd for $C_{13}H_{28}O_6N_2S_2$: C, 41.91; H, 7.58; N, 7.52. Found: C, 42.22; H, 7.42; N, 7.42.

Example 6

Piperidine was reacted with phosgene in the presence of xylene, utilizing substantially the same procedure as that described for reacting morpholine and phosgene in Example 2, and the product obtained after distillation of the solvent was purified by fractional distillation in a Vigreux column to produce piperidinoformylchloride; B. P. 81–82° C./1 mm.

55 g. (0.37 mole) of piperidinoformylchloride, prepared as described above, was reacted with 42.4 g. (0.4 mole) of dimethylaminoethylthiol (prepared as described in Example 1) and the reaction product was treated, in substantially the same manner as that described in Example 2 for the preparation of dimethyl-$\beta$-(morpholinoformylmercapto)ethyl-amine, to produce 79 g. of dimethyl-$\beta$-(piperidinoformylmercapto)ethyl-amine; which was obtained in the form of a liquid in a yield of approximately 98% of theory.

Example 7

68 g. of dimethyl-$\beta$-(piperidinoformylmercapto)ethylamine, prepared as described in Example 6, was reacted with ethyl iodide, utilizing substantially the same procedure as that described in Example 3 for preparing dimethylethyl-$\beta$-(morpholinoformylmercapto)ethyl-ammonium iodide, to produce 108 g. of dimethylethyl-$\beta$-(piperidinoformylmercapto)ethyl-ammonium iodide; M. P. 140–140.5° C.; yield approximately 92% of theory. Analysis calc'd for $C_{12}H_{25}ON_2SI$: C, 38.71; H, 6.77; N, 7.52. Found: C, 38.71; H, 6.75; N, 7.56.

Example 8

107 g. of dimethylethyl-$\beta$-(piperidinoformylmercapto) ethyl-ammonium iodide, prepared as described in Example 7, was reacted with silver sulfate, utilizing substantially the same procedure as that described in Example 4, to produce 85 g. of dimethyl-$\beta$-(piperidinoformylmercapto)ethyl-ammonium sulfate; M. P. 116–117° C. dec.; yield approximately 93.5% of theory. Analysis calc'd for $C_{24}H_{50}O_6N_4S_3 \cdot 2.5H_2O$: $H_2O$, 7.13. Found: $H_2O$, 7.04. Sample dried to constant weight at 80° C./1 mm.; calc'd for $C_{24}H_{50}O_6N_4S_3$: N, 9.55. Found: N, 10.08.

Example 9

11 g. of dimethyl-$\beta$-(piperidinoformylmercapto)ethylamine, prepared as described in Example 6, was reacted with diethyl sulfate in the presence of diethyl ether, utilizing substantially the same procedure as that described in Example 5, to produce 18.5 g. of dimethylethyl-$\beta$-(piperidinoformylmercapto)ethyl-ammonium ethylsulfate; M. P. 74-76° C.; yield approximately 100% of theory. Analysis calc'd for $C_{14}H_{30}O_5N_2S_2 \cdot 1/10 \, H_2O$: C, 45.16; H, 8.17; N, 7.52; $H_2O$, 0.48. Found: C, 44.87; H, 7.90; N, 7.06; $H_2O$, 0.35.

Modifications may be made in carrying out the present invention without departing from the spirit and scope thereof. Insofar as these changes and modifications are within the purview of the annexed claims, they are to be considered as part of our invention.

We claim:
1. Quaternary salts having the formula:

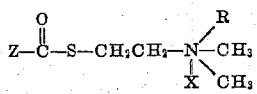

wherein Z is a radical selected from the group which consists of piperidino and morpholino radicals, R is a lower alkyl radical, and X is an anion derived from RX where RX is a lower alkyl ester of an inorganic acid.

2. Dimethylethyl - $\beta$ - (morpholinoformylmercapto)ethyl-ammonium sulfate.

3. Dimethylethyl - $\beta$ - (morpholinoformylmercapto)ethyl-ammonium ethyl sulfate.

4. Dimethylethyl - $\beta$ - (piperidinoformylmercapto-)ethyl-ammonium ethylsulfate.

JOHN WEIJLARD.
MAX TISHLER.

References Cited in the file of this patent

UNITED STATES PATENTS

| Number | Name | Date |
| --- | --- | --- |
| 2,203,505 | Piggott et al. | June 4, 1940 |
| 2,390,555 | Richardson | Dec. 11, 1945 |
| 2,510,773 | Clinton | June 6, 1950 |
| 2,548,679 | Olin | Apr. 10, 1951 |
| 2,553,994 | Wuest | May 22, 1951 |